United States Patent
Kovacs et al.

(10) Patent No.: US 11,350,616 B2
(45) Date of Patent: Jun. 7, 2022

(54) ERRATIC UNCONTROLLED LURE

(71) Applicants: Richard Kovacs, Cape Coral, FL (US); Glen Welle, Punta Gorda, FL (US); Mark Welle, Punta Gorda, FL (US)

(72) Inventors: Richard Kovacs, Cape Coral, FL (US); Glen Welle, Punta Gorda, FL (US); Mark Welle, Punta Gorda, FL (US)

( * ) Notice: Subject to any disclaimer, the term of this patent is extended or adjusted under 35 U.S.C. 154(b) by 222 days.

(21) Appl. No.: 16/663,078

(22) Filed: Oct. 24, 2019

(65) Prior Publication Data
US 2020/0128805 A1 Apr. 30, 2020

Related U.S. Application Data

(60) Provisional application No. 62/750,183, filed on Oct. 24, 2018.

(51) Int. Cl.
*A01K 85/10* (2006.01)
*A01K 85/02* (2006.01)

(52) U.S. Cl.
CPC .............. *A01K 85/10* (2013.01); *A01K 85/02* (2013.01)

(58) Field of Classification Search
CPC ................................. A01K 85/10; A01K 85/12
USPC ........................................................ 43/42.19
See application file for complete search history.

(56) References Cited

U.S. PATENT DOCUMENTS

| | | | | |
|---|---|---|---|---|
| 1,333,154 A * | 3/1920 | Buddle | ................. | A01K 85/02 43/42.23 |
| 2,291,422 A * | 7/1942 | Thomas | ................. | A01K 85/14 43/42.18 |
| 2,603,024 A * | 7/1952 | Pollard | ................. | A01K 85/14 43/42.19 |
| 2,835,068 A * | 5/1958 | Latham | ................. | A01K 85/16 43/42.16 |
| 3,670,446 A * | 6/1972 | Wheeler | ................. | A01K 83/00 43/42.19 |
| 4,142,319 A * | 3/1979 | Mihaljevic | ............ | A01K 85/14 43/42.39 |
| 4,453,333 A * | 6/1984 | Olson | .................... | A01K 85/00 43/42.23 |
| 4,617,753 A * | 10/1986 | Pauley | ................. | A01K 85/10 43/42.09 |
| 4,777,761 A * | 10/1988 | Renaud | ................. | A01K 85/16 43/42.03 |
| 5,337,508 A * | 8/1994 | Pfeiffer | ................. | A01K 85/16 43/42.03 |

(Continued)

FOREIGN PATENT DOCUMENTS

| | | | | |
|---|---|---|---|---|
| CA | 2234279 A1 * | 10/1999 | ............. | A01K 85/12 |
| CA | 2501536 A1 * | 9/2006 | ............. | A01K 85/00 |
| WO | WO-2018165506 A1 * | 9/2018 | ............. | A01K 85/12 |

*Primary Examiner* — Christopher P Ellis
(74) *Attorney, Agent, or Firm* — Andrew Morabito

(57) ABSTRACT

In a first embodiment, a fishing lure comprising, a body having a fish like design with a first end and second end and a groove distal to the second end incorporated into the body, a hook integrated into the first end of the body, a stem extending a predetermined distance from the second end of the body, wherein the stem is capped, a bead inserted onto the stem, a spinner blade having at least three openings, attached to the stem by a first opening, wherein the spinner blade can rotate 360 degrees about a center axis of the stem, and a line attachment secured through a second and third opening of the spinner blade.

12 Claims, 3 Drawing Sheets

(56) References Cited

U.S. PATENT DOCUMENTS

| | | | | |
|---|---|---|---|---|
| 5,388,367 | A * | 2/1995 | Rydell | A01K 83/00 43/42.1 |
| 5,857,283 | A * | 1/1999 | Perrick | A01K 85/08 43/42.5 |
| 5,918,406 | A * | 7/1999 | Wilson | A01K 85/00 43/42.28 |
| 6,176,035 | B1 * | 1/2001 | Somogyi | A01K 85/12 43/42.14 |
| 7,621,068 | B1 * | 11/2009 | Renosky | A01K 85/01 43/42.03 |
| 7,694,453 | B1 * | 4/2010 | Arrico | A01K 85/02 43/42.13 |
| 8,733,012 | B2 * | 5/2014 | Thorne | A01K 85/00 43/42.24 |
| 9,089,120 | B2 * | 7/2015 | Davis | A01K 91/04 |
| 10,477,845 | B1 * | 11/2019 | Davis | A01K 85/02 |
| 10,609,911 | B1 * | 4/2020 | Renosky | A01K 85/10 |
| 10,645,913 | B1 * | 5/2020 | Coxey | A01K 95/02 |
| 10,834,909 | B1 * | 11/2020 | Rye | A01K 85/10 |
| 10,993,422 | B1 * | 5/2021 | Maji | A01K 85/08 |
| 2003/0037478 | A1 * | 2/2003 | Hisaw | A01K 85/00 43/17.1 |
| 2005/0235549 | A1 * | 10/2005 | Griss | A01K 85/00 43/42.06 |
| 2006/0080886 | A1 * | 4/2006 | Gawlik | A01K 85/10 43/42.19 |
| 2006/0086034 | A1 * | 4/2006 | Ukita | A01K 85/12 43/42.06 |
| 2007/0277423 | A1 * | 12/2007 | Edwards | A01K 85/00 43/42.13 |
| 2008/0172923 | A1 * | 7/2008 | Nicholson | A01K 85/00 43/42.19 |
| 2008/0172924 | A1 * | 7/2008 | Thorne | A01K 85/00 43/42.47 |
| 2008/0263935 | A1 * | 10/2008 | Albrecht | A01K 85/10 43/42.13 |
| 2013/0036654 | A1 * | 2/2013 | Goosey | A01K 85/12 43/42.31 |
| 2013/0047491 | A1 * | 2/2013 | Davis | A01K 85/14 43/42.41 |
| 2015/0264905 | A1 * | 9/2015 | Lestander | A01K 85/18 43/42.03 |
| 2017/0099822 | A1 * | 4/2017 | Thorne | A01K 85/00 |
| 2018/0368375 | A1 * | 12/2018 | Folkersen | F21V 23/0407 |
| 2019/0029239 | A1 * | 1/2019 | Schwartz | A01K 85/14 |
| 2019/0045764 | A1 * | 2/2019 | Gibson | A01K 85/18 |
| 2019/0133099 | A1 * | 5/2019 | Ostruszka | A01K 85/18 |
| 2020/0344986 | A1 * | 11/2020 | Queen | A01K 85/14 |
| 2021/0000094 | A1 * | 1/2021 | Dunbar | A01K 85/10 |

* cited by examiner

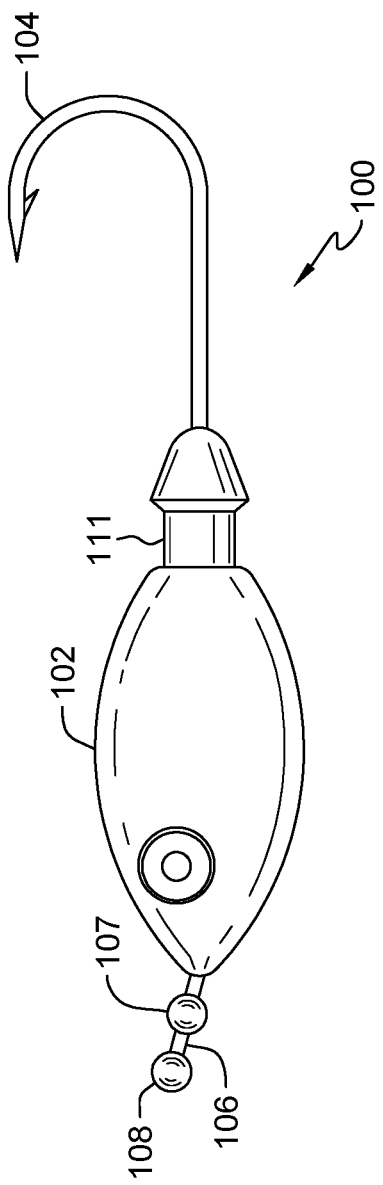
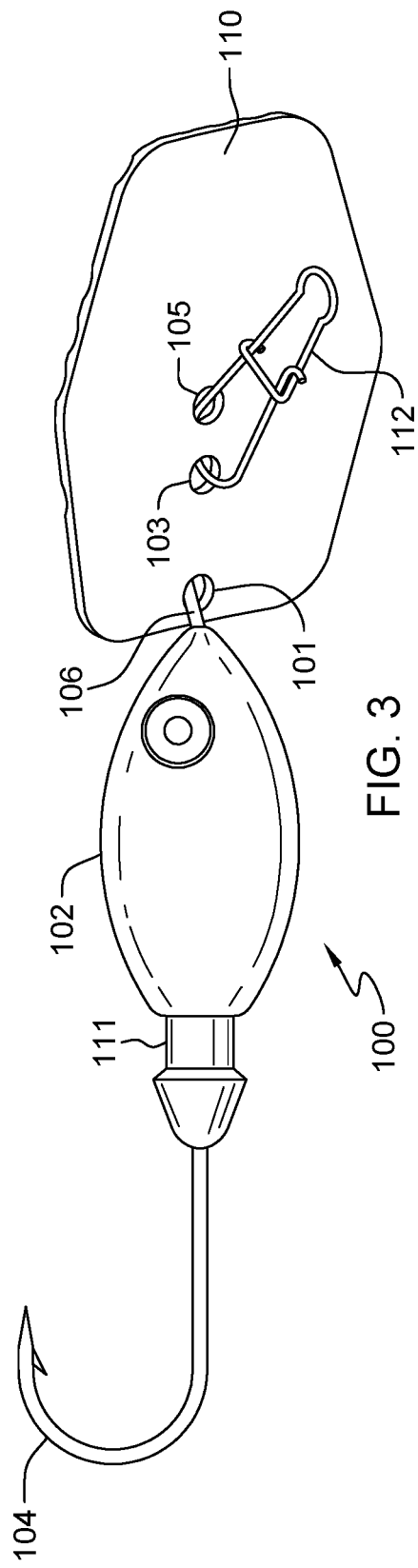

ERRATIC UNCONTROLLED LURE

BACKGROUND

The present invention relates generally to the field of fishing lures, and more particularly to a fishing lure with an erratic and uncontrolled movement pattern.

Sport fishing has been and continues to be enjoyed by a vast number of fisherman and has grown to the extent that it is now one of the largest participant sports. As the sport of fishing has increased in popularity, the fishing tackle industry has experienced growth, responding both to the needs of the participants.

Numerous fishing lures have been developed over the years in attempts to attract, and thus catch, more game fish. Some of the more popular lure styles include jigs, jerk baits, crank baits, chatter baits and spinner baits.

A chatter bait is a type of lure that combines a jig with a blade attached near the front of the jig to impart a vibrating movement. The line attaches to a snap located at the front end of the blade which sits in front of the jig. It is desirable for a fishing lure to include a blade or other feature to create motion, and to reflect light, to give the jig a simulated natural swimming motion resembling a minnow or other food source for the sport fish being sought.

There is a need for a lure that includes features pertaining to the production of an underwater movement that is attractive to fish. Thus, it is desired to have a fishing lure that provides the structural strength of a larger lure, but with the spinners having the ability to vibrate through the water.

SUMMARY

In a first embodiment, the present invention is a fishing lure comprising; a body having a first end and second end; a hook attached to the first end; a stem attached to the second end; a spinner blade secured along the stem, wherein the spinner blade is able to rotate freely about a center axis of the stem; and a line connector connected to the spinner blade.

In a second embodiment, the present invention is a fishing lure comprising: a body having a fish like design with a first end and second end and a groove distal to the second end incorporated into the body, a hook integrated into the first end of the body, a stem extending a predetermined distance from the second end of the body, wherein the stem is capped, a bead inserted onto the stem, a spinner blade having at least three openings, attached to the stem by a first opening, wherein the spinner blade can rotate 360 degrees about a center axis of the stem, and a line attachment secured through a second and third opening of the spinner blade.

In a third embodiment, the present invention is a fishing lure comprising: a body having a first end and second end; at least one hook attached to the first end; at least one stem attached to the second end; at least one spinner blades attached to the at least one stems, wherein the spinner blades are able to rotate freely; and a line connector connected to one of the at least one spinner blades.

In a fourth embodiment, the present invention is a fishing lure comprising: a body having a first end and second end, wherein the second end has a capped extension protruding outwards away from the body; a blade having a plurality of openings is attached to the capped extension, wherein the blade is able to rotate freely about a center axis of the capped extension and has an erratic movement; a line tie is secured to at least one of the plurality of openings wherein the line tie does not interfere with the blade's ability to freely rotate about the center axis of the capped extension; and a hook extending from the first end of the body.

BRIEF DESCRIPTION OF THE SEVERAL VIEWS OF THE DRAWINGS

FIG. 2 depicts a side view of the lure, in accordance with one embodiment of the present invention.

FIG. 3 depicts a side view of the lure, in accordance with another embodiment of the present invention.

DETAILED DESCRIPTION

The present invention relates to a lure which allows for an increased structural integrity while also allows for the extensions to vibrate as they travel through the water. The lure allows the participant to experience the benefits of the spinner lure design without the fear that the lure will not be able to hook and keep a larger fish. The lure design allows for a lure with a multitude of spinners based on the main body design that is split to create the spinner extensions.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Figure 1:
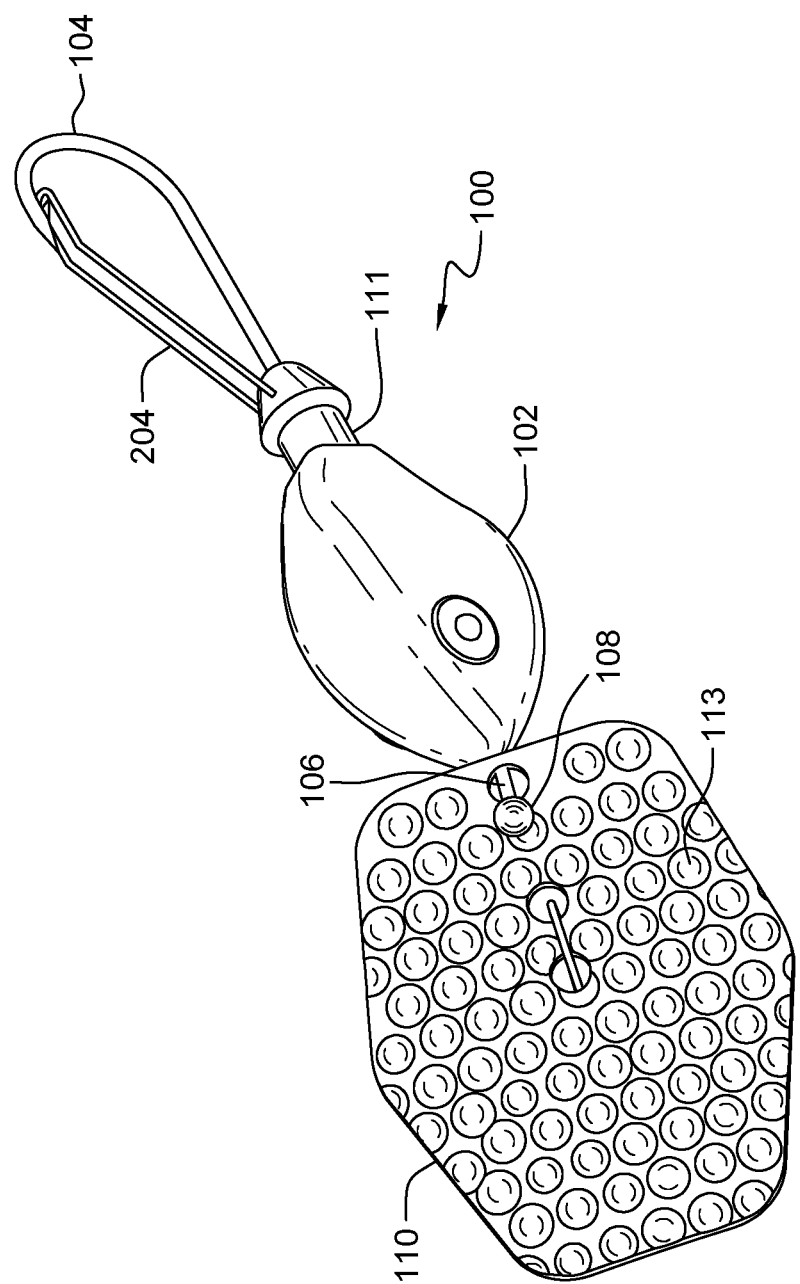
FIG. 1 depicts an isometric view of a lure, in accordance with one embodiment of the present invention.

FIG. 1 depicts an isometric view of a lure 100, in accordance with one embodiment of the present invention. The lure 100 is comprised of a body 102, a hook 104, a stem 106, and a spinner blade 110.

The body 102 is made from various materials (e.g. metal, plastic, wood, etc.) with various shapes and sizes to imitate bait specific to the type of fish the person is trying to catch. The body 102 may have various colors, coatings, or visual aspects to increase the allure of the fish. The hook 104 maybe integrated into the body 102, as in the depicted embodiment of the present invention. In the depicted embodiment, the body 102 has an indent 111 to allow for the attachment and securing of additional features to the lure 100 (shown in FIG. 4). The indent 111 or groove in the body 102 may be various shapes, contours, or designed based on the skirt or attachment which is secured to the body 102. In the depicted embodiment, the indent 111 has a front and rear side wall to keep the skirt attached when the lure 100 is in use. In additional embodiments, the hook 104 may be detached and/or replaceable. Hooks 104 of various sizes may be used based on the size of the fish the fisherman is after. The hook 104 in the depicted embodiment, is at one end of the body 102 and the stem 106 is at the opposite end. In various embodiments one or more hooks 104 may be integrated with the body 102 at various points and positions on the body 102 provided they do not interfere with the spinner blade 110. The stem 106 is provides an extension that the spinner blade 110 and the attachment 107 are secured to. In the depicted embodiment, the stem 106 has a cap 107 at the end to keep the attachment 107 and the spinner blade 110 attached to the body 102. The length of the stem 106, the thickness of the stem 106, and the curvature of the stem 106 are all variable and customizable based on the intended target fish. In the depicted embodiment, there is one stem 106. In various embodiments, additional stems 106 may be integrated with the body 102.

The spinner blade 110 is designed to move erratically and uncontrollably through the water. This is accomplished by the shape, contour, and that it is freely connected to the stem 106 and is able to rotate about the stem 106. The stem 106 has a stopper 108 at the end of the stem 106 to keep the spinner blade 110 attached to the stem 106. The spinner blade 110 has an opening 101 which the stem 106 passes through. The spinner blade 110 is provided with a moderate twist from the front end to rear end to impart rotation and some fluttering movement as it is pulled through the water or held in place in moving water. Based on the contour of the spinner blade 110, the movement can be adjusted to be moderate or extreme. With the increased twist and angled integrated into the spinner blade 110, the movement can be increased substantially through the water. The spinner blade 110 may have various textures and coatings to both affect the movement of the spinner blade 110 in the water, or to interact with the light which comes in contact with the spinner blade 110 to further allure the fish.

During operation the spinner blade 110 is able to rotate 360 degrees about the center axis of the stem 106. The spinner blade 110 movement through the water causes the lure to dart or move left and right in an inconsistent, uncontrolled, and erratic fashion. This erratic movement is beneficial because it creates a vibration, a unique reflection to the light. This design also incorporates minimal parts and does not require additional wires split rings, or the like which are typically necessary. In the depicted embodiment, the spinner blade 110 is textured on a first side and smooth on the second side. Various textures can be applied to one or either side.

The close-up image shows the surface of the spinner blade 110 with the dimples 109 to further increase the erratic behavior of the spinner blade 110 in the water and to create the reflection of the sun off the dimples in the water. This further optimizes the change of the fish responding to the lure 100. The position of openings 103 and 105 are relative to the opening 101 so that lure's 100 behavior is ideal. The greater the distance between opening 103 and 101, the less erratic behavior of the spinner blade 110.

FIG. 2 depicts a side view of the lure 100 without the spinner blade 110, in accordance with one embodiment of the present invention.

The attachment 107 is freely connected to the stem 106 to allow the attachment 107 to move along the stem 106. In the depicted embodiment the attachment 107 is a sphere with an opening passing through the center. In various embodiments, the attachment 107 may have various shapes, sizes, colors, coatings, or designed to improve the visual effect of the lure 100. In the depicted embodiment, one attachment 107 is positioned between the spinner blade 110 and the cap 107. In various embodiments, the attachment 107 may be positioned between the spinner blade 110 and the body 102.

FIG. 3 depicts a side view of the lure 100 with the spinner blade 110 attached, in accordance with another embodiment of the present invention.

The spinner blade 110 has a set of openings 101, 103, and 105 to connect the spinner blade 110 to the body 102 via the stem 106, and to connect a snap 112 or other contraption to connect the fishing line to the lure 100. The openings 103 and 105 are positioned based on the design of the spinner blade 110 to generate the erratic movement in the water. Opening 101 is positioned based on the stem 106 design. In some embodiments, openings 103 and 105 may not both be required, and the two openings are replaced by one opening. This is based on the mechanism which connects the line to the lure 100.

Various other variations of snaps 112 and fishing line trying mechanism can be employed and the spinner blade 110 has openings or attachment means. In additional embodiments various openings and attachment points may be used provided they do not interfere with the sporadic and erratic movement of the lure.

The spinner blade 110 may have a variety of sizes, shapes, contours, curvatures, coatings, textures, and other physical alterations from the depicted spinner blade 110 that are known to one skilled in the art. The depicted spinner blade 110 shows a single embodiment of the spinner blade 110 and is not designed to limit the shape and look of the spinner blade 110. A large variety of spinner blades 110 can be used based on the target fish. Varying these physical characteristics affect how the spinner blade 110 reacts in the water. In some embodiments both sides of the spinner blade 110 have a texture. The textures may be the same or different on either side of the spinner blade 110. Additionally, the lure 100 may have multiple spinner blades 110 attached to the body 102.

The body 102 may have various designs and shapes based on the intended use of the lure 100, and the intended fish which the lure 100 is designed to catch. This may include mimicking the shape and color of prey for the intended target fish.

The benefit of the lure is that when reeling in the lure, the spinner blade 110 ability to freely rotate about the rod, allows the lure 100 & 200 to dart back and forth in the water based on the water resistance on the spinner blade 110 to give the illusion of a real fish. The force on the lure from the speed at which one is reeling it in, the current of the water, all affect the blade and how it reacts.

Figure 4:
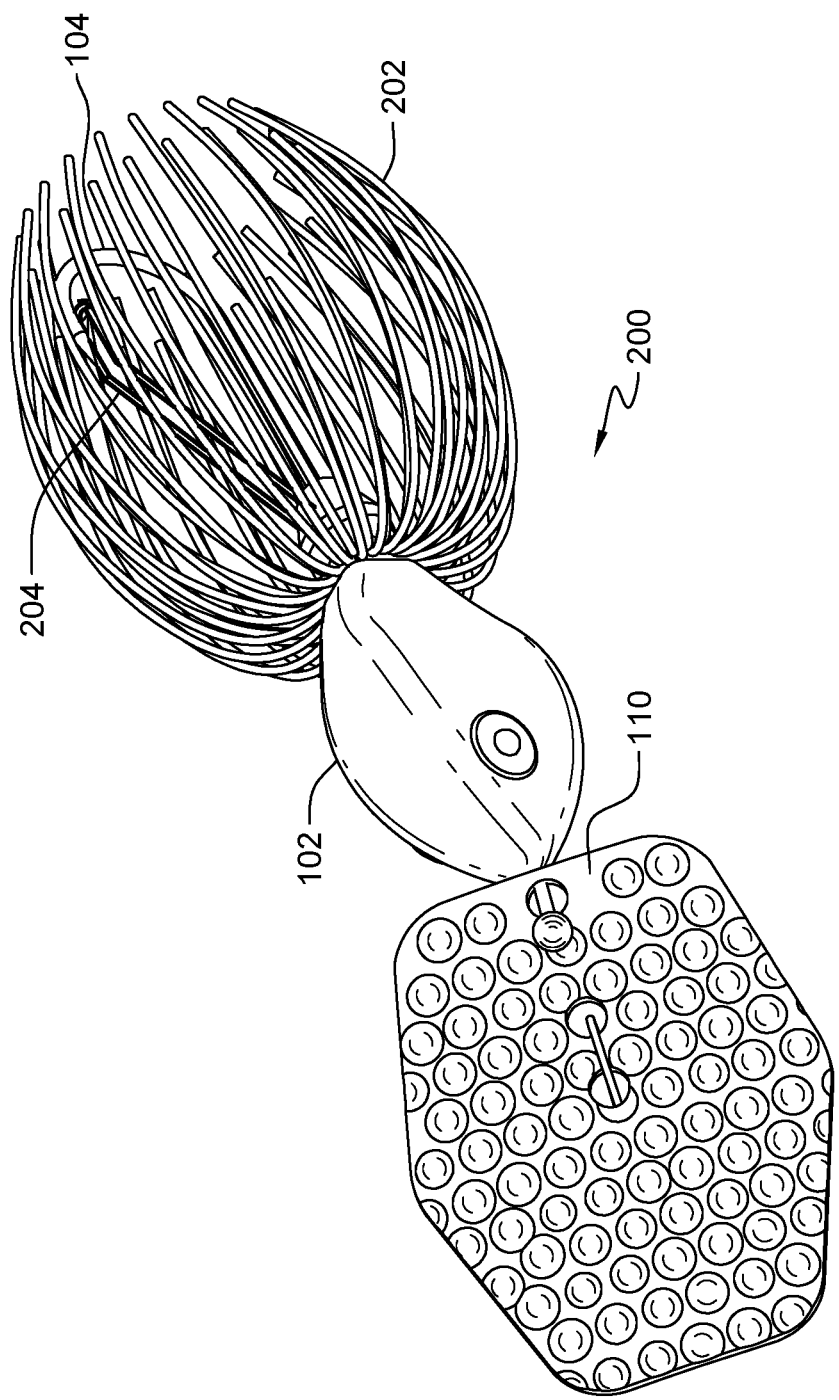
FIG. 4 depicts an isometric view of the lure, in accordance with another embodiment of the present invention.

FIG. 4 depicts an isometric view of a lure 200, in accordance with another embodiment of the present invention. The lure 200 is shown with skirt 202 attached to the body, with the use of band 204. The skirt 202 is extended over the body 102, and the band 204 is secured to the body in the indent or groove 111. This keeps the skirt 202 in place and allows for yet another feature of the lure to increase the change of the fish responding to the lure 200. Various types of grooves or indents 111 may be incorporated into the body 102 based on the type of skirt 202 used. Additionally, the lure 200 has a looped wire 204 which can assist with stabilizing the body 102 of the lure 200, while allowing the spinner blade 110 to perform erratically. The looped wire 204 may also be used as a hook guard and is used to reduce the opportunity for the hook to get caught on weeds, grasses, or sticks in the water.

The skirt 202 is attached to the lure 200 and used to draw attention of the fish in the area. The skirt 202 may be attached to the lure 200 via various means to permanently affix the skirt 202 to the lure 200. For example, but not limited to, welding, fusing, or using an adhesive to affix the skirt 202 to the lure 200. The skirt 202 is comprised of a plurality of filaments. The filaments may be made from a plastic, a fabric, a composite material, or a material known to one of skill in the art. The filaments are a predetermined thickness, a predetermined length, and a predetermined quantity. The skirt 202 may be one color or a combination thereof and may have different types of materials and hews distending in both directions from where the skirt 202 affixed to the lure 200. From 32 to 120 filaments of the skirt 202 are preferred in most lure 200s. The length of the skirt 202 may also vary as to the size of the hook and the type of fish to be caught. In some embodiments, the skirt 202 is detachable and replaceable with a locking mechanism implemented to allow this release and replacement of the skirt 202.

The hook 104 is a conventional fishing hook and is affixed to the lure 100 and 200. The hook 104 size may vary, depending on the application. Various styles of hooks 104 may be employed, and more than one hook may be used. For example, a single, double, or treble hook 104 may be used.

In additional embodiments, additional beads may be used along the stem 106 portion of the lure 100 and 200 to provide additional elements which will move or shift in the water to draw attention to the fish. Additional spinner blades 110 may be used as well provided the stem 106 is of a length to allow each spinner blade 110 to freely rotate in the water without interfering with the other spinner blades 110.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A fishing lure comprising:
   a body having a first end and second end, wherein an indent is present distal to the second end;
   a hook attached to the first end;
   a skirt sized to fit within the indent of the body and substantially cover the hook;
   a hook guard extending from the body relative to the position of the hook;
   a stem attached to the second end, wherein the steam has at least two beads attached;
   a flat spinner blade with three apertures secured to the steam at a first aperture between the two beads, wherein the spinner blade is able to rotate freely about a center axis of the stem and the spinner blade has textured surface; and
   a line connector connected to the spinner blade via the second and third apertures.

2. The fishing lure of claim 1, wherein the spinner blade has a first side and a second side, and at least one of the sides has a texture.

3. The fishing lure of claim 1, wherein the spinner blade has a predetermined curvature to increase the sporadic and erratic movement of the spinner blade.

4. The fishing lure of claim 1, wherein the hook is integrated into the body.

5. The fishing lure of claim 1, wherein the skirt has at least thirty-two filaments.

6. The fishing lure of claim 1, further comprising a bead inserted onto the stem, wherein the bead is able to freely move along the stem.

7. The fishing lure of claim 1, wherein the stem has a cap at the free end to secure the spinner blade onto the stem.

8. A fishing lure comprising:
   a body having a fish like design with a first end and second end and a groove distal to the second end incorporated into the body, a hook and a hook guard integrated into the first end of the body, a skirt fitted into the groove a stem extending a predetermined distance from the second end of the body, wherein the stem is capped, a bead inserted onto the stem, a spinner blade have at least six sides and a textured surface having dimples and having at least three openings, attached to the stem by a first opening, wherein the spinner blade can rotate 360 degrees about a center axis of the stem, and a line attachment secured through a second and third opening of the spinner blade.

9. The fishing lure of claim 8, wherein the spinner blade has a first side and a second side, and at least one of the sides has a texture.

10. The fishing lure of claim 8, wherein the first, second, and third openings are positioned along a central axis of the spinner blade, wherein the positioning of the openings does not interfere with the sporadic and erratic movement of the spinner blade.

11. The fishing lure of claim 8, wherein the hook is replaceable.

12. The fishing lure of claim 8, wherein the spinner blade is replaceable.

\* \* \* \* \*